United States Patent [19]
Samra

[11] 3,800,430
[45] Apr. 2, 1974

[54] MULTIPLE PURPOSE VEHICLE SIGNAL DEVICE

[76] Inventor: Herb G. Samra, 1606 N. 74th Ct., Elmwood Park, Ill. 60635

[22] Filed: Jan. 3, 1972

[21] Appl. No.: 214,890

Related U.S. Application Data

[63] Continuation-in-part of Ser. No. 43,370, June 4, 1970, Pat. No. 3,656,104.

[52] U.S. Cl. ............................. 340/95 R, 340/87 R
[51] Int. Cl. ............................................. B60q 1/32
[58] Field of Search ........ 340/87 R, 95 H; 40/206 R

[56] References Cited
UNITED STATES PATENTS

| | | | |
|---|---|---|---|
| 1,529,366 | 3/1925 | Miller | 340/119 R |
| 1,535,013 | 4/1925 | Zillman | 340/119 R |
| 1,548,620 | 8/1925 | Lollis | 340/119 R |
| 2,706,806 | 4/1955 | Johnson | 340/119 R UX |
| 2,866,175 | 12/1958 | Slater | 340/95 X |
| 3,351,904 | 11/1967 | Noruk | 340/119 X |
| 3,408,624 | 10/1968 | Kennelly | 340/87 X |
| 3,603,928 | 9/1971 | Speedy | 340/87 R |
| 1,559,128 | 10/1925 | Pettit | 40/206 R |
| 1,985,227 | 12/1934 | Bland | 40/210 R X |
| 2,035,659 | 3/1936 | Lindstrom | 40/206 R |
| 2,236,879 | 4/1941 | Morris | 340/95 R |
| 2,508,671 | 5/1950 | Gropper | 40/206 R |
| 2,559,163 | 7/1951 | MacDonald | 340/87 R |

*Primary Examiner*—Harold I. Pitts
*Attorney, Agent, or Firm*—Hill, Sherman, Meroni, Gross & Simpson

[57] ABSTRACT

A visual signal device for vehicles adapted to be selectively mounted inside or outside the vehicle and controlled from the driver's seat to beam an otherwise inconspicuous interchangeable signal indicia providing an advance warning to traffic or pedestrians in a flashing, conspicuous manner. The device has an opening receiving one or more window panels which when illuminated by illuminating means in the device will beam a desired message. The device also has a storage compartment for storing additional window panels and mounting means coacting with bracket means that will accommodate adjustments, for example, such as vertical, horizontal and tilting adjustments of the device. A panel adjacent to the driver's seat contains a switch, a fuse, an indicator such as a light or buzzer and flasher means to control the illuminating means in the device.

8 Claims, 13 Drawing Figures

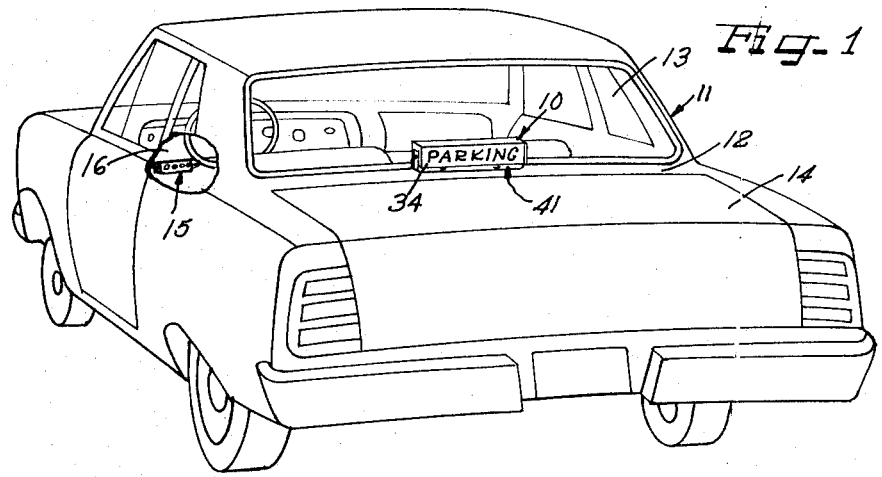
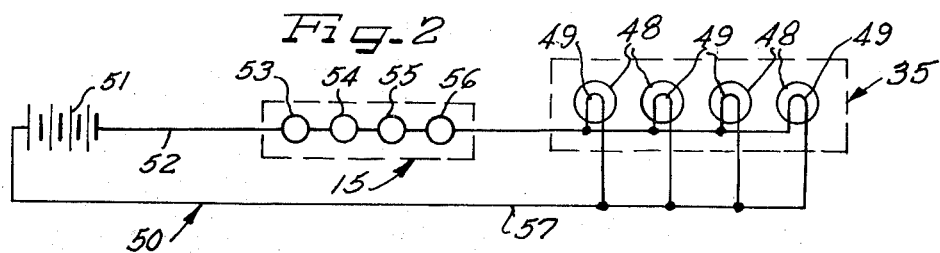
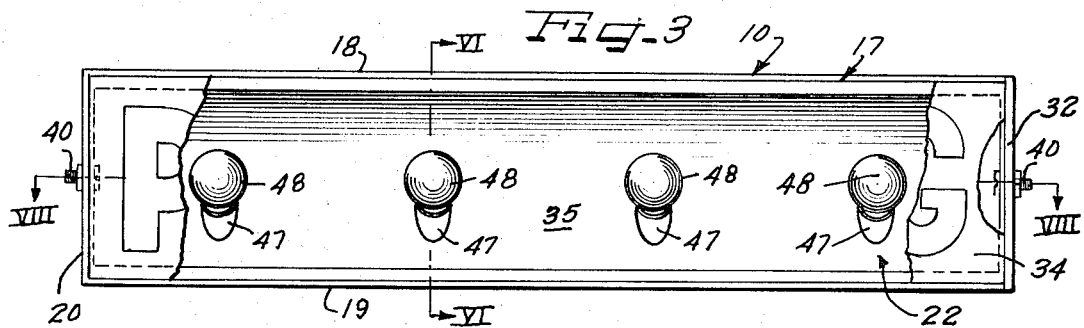
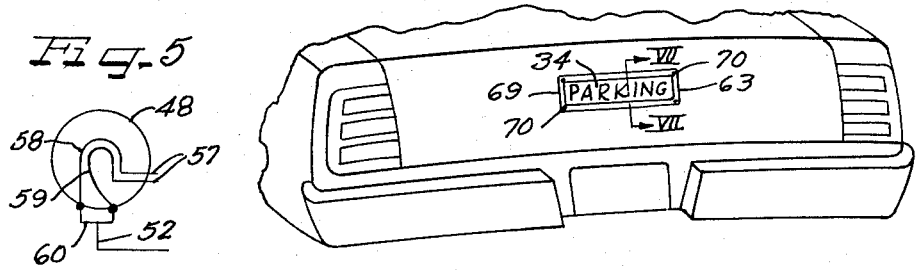

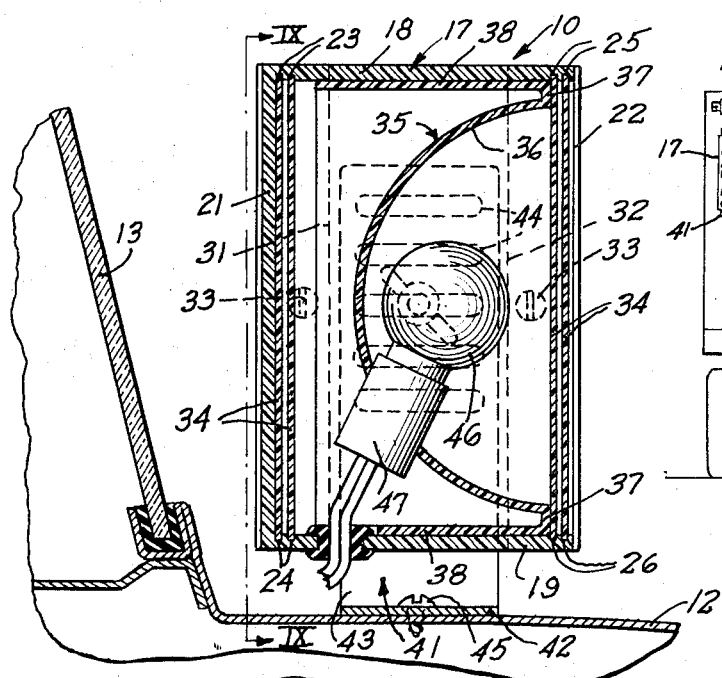

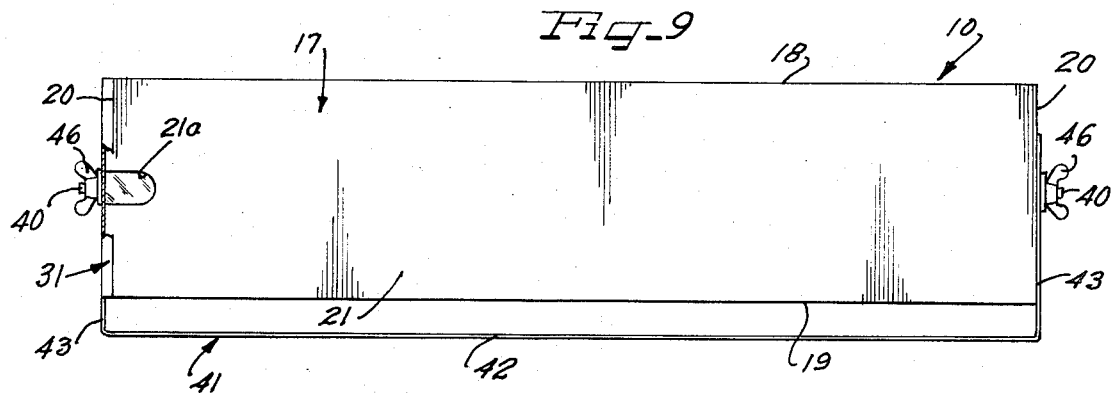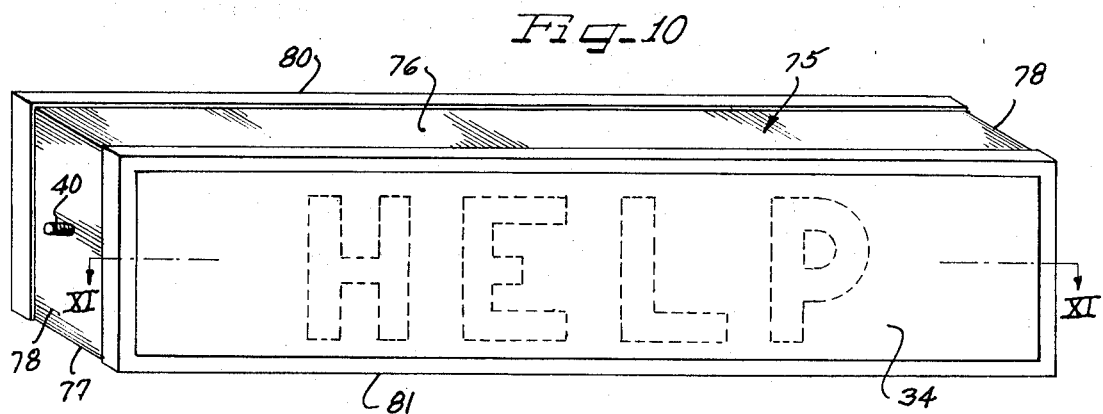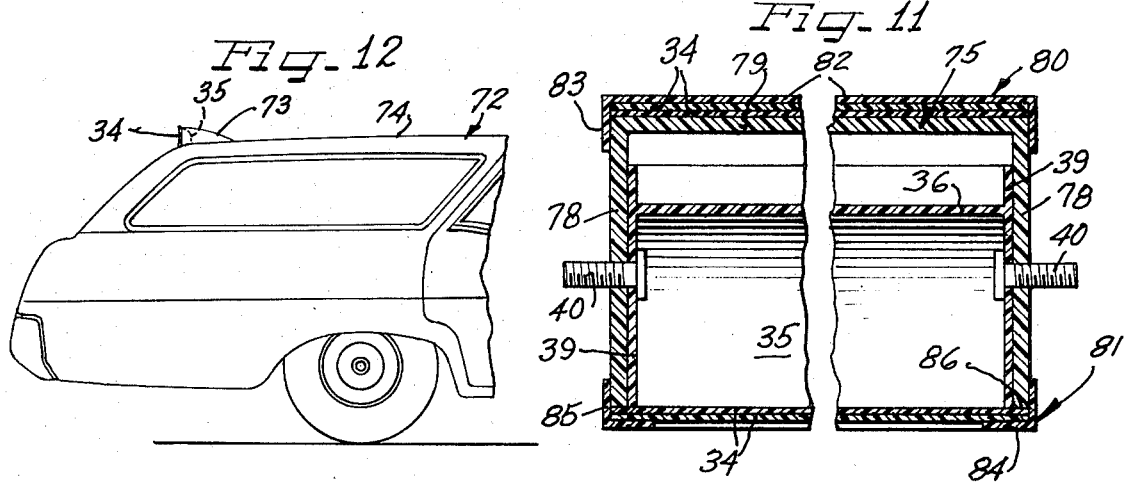

MULTIPLE PURPOSE VEHICLE SIGNAL DEVICE

RELATED APPLICATION

This application is a continuation-in-part of my U.S. Patent application entitled "Advance Anti-Lockout Vehicle Parking Signal," Ser. 43,370, filed June 4, 1970, now U.S. Pat. No. 3,656,104, issued Apr. 11, 1972.

FIELD OF THE INVENTION

This invention relates to improvements in vehicle signal devices of the type disclosed and claimed in my parent application, Ser. 43,370, filed June 4, 1970 and particularly deals with vehicle signal devices that can be easily mounted at any desired location inside or outside a vehicle, having interchangeable windows with signal indicia or designed coloring, a storage compartment for spare windows, an improved illuminating means carrier, and improved circuitry arrangements.

DESCRIPTION OF THE PRIOR ART

As explained in my parent application, Ser. 43,370, conventional automotive vehicle lights, such as stop lights, flash or emergency lights and turn signal lights are automatically interrupted by releasing the brakes, by propelling the vehicle, by turning the wheels, and the like. Such signals cannot be depended upon to give an advance indication or warning of intent to park the vehicle, to load an already parked vehicle, to call for help in an emergency and the like. The prior art did not provide an effective indicator that could be depended upon to signal in advance to traffic or pedestrians that the vehicle is to pull into a parking space so that vehicles or people may maneuver accordingly while the parking space is reserved for the signalling vehicle.

SUMMARY OF THE INVENTION

This invention now provides improvements in my "Advance Anti-Lockout Vehicle Parking Signal" disclosed and claimed in my aforesaid parent application which will permit the interchange of signal indicia, will accommodate inside and outside vehicle mounting, include use of the vehicle body as a casing and which has a panel board easily mounted on the dash or kickboard of a vehicle containing a switch, an indicator such as a buzzer or like and other means such as a fuse or flasher unit. The casing of the device is rectangular with a rear open side removable mounting one or more window panels and with a storage chamber at the front side for interchangeable spare window panels. A lamp carrier is telescoped into the casing through the open rear side thereof and provides lamp mountings along the length of the casing as well as the reflector for the lamps. A bracket has legs straddling the ends of the casing receiving studs projecting from the ends of the casing and accommodating horizontal or vertical or and tilting adjustment of the casing relative to the bracket mounting. The bracket has a base attached either in front of the rear window of the vehicle or to the exterior vehicle body at a selected position. The window panels are easily transferred between the storage compartment and the use position overlying the lamp carrier in the open rear side of the casing.

The lamp carrier can be used without the casing in installations using the vehicle body or cowling on the body as a covering.

A simplified circuitry, independent of the vehicle wiring system is provided and includes a dashboard or kickboard mounted panel adjacent to the driver's seat equipped with a switch, an indicator such as a buzzer or like, a flasher unit, and a fuse. Alternately, of course, as disclosed in my parent application the fuse and flasher unit could be mounted in the casing or on the lamp carrier. The independent circuity is energized from the vehicle battery and will not be influenced by any malfunctioning or interruption of other vehicle circuity, mechanisms or systems.

It is then an object of this invention to provide improvements in the signal device of my parent application, Ser. 43,370 which will accommodate the mounting of the device as desired inside or outside of the vehicle, will accommodate and store interchangeable windows, and has an illuminating means carrier that can be mounted in a casing or in part of the vehicle body.

Another object of the invention is to provide a vehicle signal device with completely independent circuity including a panel board adapted to be mounted on the dashboard or kickboard of the vehicle.

A further object of the invention is to provide a lamp bulb carrier for a vehicle signal device accommodating single or double filament light bulbs and having an independent simple circuit energizing the bulbs.

Another object of the invention is to provide a vehicle signal device with a generally rectangular casing having tracks removably receiving signal indicia in an easy, practical and useful manner.

A further object of the invention is to provide a vehicle signal device with a casing that stores spare signal indicia.

Other and further objects of the invention will be apparent to those skilled in this art from the following detailed description of the annexed sheets of drawings which, by way of the preferred examples, illustrate several embodiments of the invention.

BRIEF DESCRIPTION OF THE DRAWINGS

FIG. 1 is a rear end perspective view of an automotive vehicle equipped with a signal device on the rear outside deck thereof and a driver actuated panel board mounted under a dashboard inside the vehicle, in accordance with this invention.

FIG. 2 is a wiring diagram illustrating the simplified independent circuity for the device of this invention.

FIG. 3 is a rear elevational view of the casing for the device of this invention with a portion broken away to show the lamp carrier in the casing.

FIG. 4 is a fragmentary view similar to FIG. 1 but illustrating another mounting arrangement for the signal device of this invention using the vehicle body as a casing part.

FIG. 5 is a fragmental diagrammatic view showing the manner in which a double filament lamp can be used in the device of this invention.

FIG. 6 is a transverse cross-sectional view along the line VI—VI of FIG. 3 on a larger scale.

FIG. 7 is a transverse cross-sectional view along the line VII—VII of FIG. 4 on a larger scale.

FIG. 8 is a broken longitudinal cross-sectional view along the line VIII-VIII of FIG. 3, with parts omitted.

FIG. 9 is a front elevational view along the line IX—IX of FIG. 6.

FIG. 10 is a perspective view of an alternate casing for the device of this invention.

FIG. 11 is a broken longitudinal cross-sectional view taken along the line XI—XI of FIG. 10.

FIG. 12 is a fragmentary side elevational view of a station wagon type vehicle with a signal device of this invention mounted in a cowling at the rear end of the roof thereof.

FIG. 13 is a rear elevational view of a truck with two arrangements of signal devices of this invention mounted on the upper rear end thereof.

BRIEF DESCRIPTION OF THE PREFERRED EMBODIMENTS

As shown in FIG. 1 the signal device unit 10 of this invention is mounted on a conventional passenger automobile 11 on the outside rear deck 12 thereof rearwardly of the rear window 13. The deck portion 12 is forwardly of the trunk lid 14.

A control panel 15 for the unit 10 is mounted inside the vehicle 11 under the dashboard 16 immediately adjacent to the driver's seat.

The unit 10 as shown in FIG. 3, 6, 8 and 9 has a rectangular metal or plastic casing 17 with flat top and bottom walls 18 and 19, end walls 20, a front wall 21, and a rear opening 22.

As shown in FIG. 6 the top wall 18 has a pair of internal longitudinal parallel grooves 23 along the length thereof adjacent the front wall 21 and the bottom wall 19 has a similar pair of grooves 24 aligned with the grooves 23. In addition the top wall 18 has a pair of similar grooves 25 and the bottom wall 19 has a pair of aligned similar grooves 26 adjacent the open rear face of the casing 10.

As shown in FIG. 8 the grooves 23 and 24 extend into one end wall 20 of the casing at 27 while the grooves 25 and 26 extend into this same end wall at 28. The other end wall 20 has vertical slots 29 and 30 registering with the grooves 23, 24 and 25, 26 respectively and extending the full height of the end wall. These slots are covered by angle strips 31 and 32. Each strip has one leg overlying the end wall 20 and a second leg overlying the adjacent edge of the front and rear of the casing respectively. A single fastener screw 33 secures each strip to the end wall.

The slots 29 and 30 freely receive windows 34 slidable in the grooves so that a pair of spare windows 34 may be mounted in the casing immediately adjacent the front wall 21 and a pair of windows 34 may cover the rear opening 22 of the casing. A thumb slot 21a is provided in the front wall 21 of the casing at the end wall 20 containing the slot 30 so that windows 34 stored in the casing adjacent the front wall can easily be removed. An opening in the central portion of the wall 21 could be provided instead of the thumb slot to serve the same purpose.

When the angle strips 31 and 32 are in position the windows 34 are tightly held in the casing. However, the strips 31 and 32 are easily removed to accommodate removal and interchange of windows.

According to this invention some of the windows 34 can be translucent with indicia such as for example "parking," "loading," "accident," "towing" and "help" thereon noticeable only when illuminated. Other windows can be clear but tinted to be used with a legend containing translucent window for imparting a desired color or tint to the beamed legend. Alternately, the legend containing window could be clear and used with a frosted overlying window screening out the legend until the device is illuminated. The grooves and covering strips will secure the window in fixed relation to the casing to prevent rattling and displacement. It should be understood that the storage compartment for spare windows provided adjacent the front wall 21 could be provided by a casing separate from the casing 17 and stored for example in the glove compartment of a passenger vehicle or under the dashboard and held in place by a clip, magnet or the like.

A combination lamp carrier and reflector 35 composed of metal, plastic or the like is mounted in the casing 17 and extends along the full length thereof with an arcuate main body portion 36 facing the open rear side 22 of the casing and having vertical outturned flanges 37 at the ends thereof aligned with the inner edges of the inner grooves 25 and 26 and with forwardly extending horizontal flanges 38 slidably seated on the inner faces of the top and bottom casing walls 18 and 19 to terminate rearwardly from the windows 34 stored in the grooves 23 and 24.

As shown in FIG. 8, the carrier strip 35 also has end walls 39 slidably engaging the inner faces of the end walls 20 of the casing 17. Mounting studs 40 extend through the end walls 34 and 20 to secure the mounting strip 35 in the casing 17. The shanks of the studs 40 project laterally outward from the end walls 20 of the casing and provide mounting means for the casing. Thus, as shown in FIGS. 1, 6 and 9, a U-shaped mounting bracket 41 has a base portion 42 underlying the casing with upturned end legs 43 straddling the end walls 20 of the casing and having slots 44 for receiving the studs 40. The base 42 is secured to the deck 12 of the vehicle by fasteners such as 45.

The slots 44 in the legs 43 of the bracket 41, as illustrated in FIG. 6, are elongated horizontally and are in vertically spaced relation. Each stud 40 projects through a selected slot 44 to mount the casing 17 at a desired level relative to the deck 12. Further the slots 44 accommodate horizontal adjustment of the casing toward and away from the rear window 13 of the vehicle and, of course, in addition, the casing can tilt relative to the bracket.

Fasteners such as wing nuts 46 threaded on the projecting ends of the studs of 40 clamp the legs 43 of the bracket tightly against the end walls 20 of the casing to lock the casing in fixed adjusted relation relative to the bracket. If desired, rubber grommets can be provided on the studs 40 between the bracket legs 43 and end walls 20 so that when the fasteners 46 are tightened the rubber will form a tight gasket between the bracket legs and the casing end walls.

The arcuate body portion of the carrier 35 mounts a plurality of lamp sockets 47 which project through the lower half of the arcuate portion 36 and are affixed thereto as by press fitting, soldering, cementing or the like. Four such sockets are shown but any number could be used and each socket mounts a light bulb 48 which can conveniently be a double or single filament conventional type automotive vehicle bulb or lamp. Alternately, the carrier 35 could have mountings for one or more tubular type bulbs.

As shown in FIG. 2, each bulb 48 has a filament 49 connected in parallel in a very simple circuit 50 including the automotive vehicle battery 51 and the control panel 15. As shown, the "hot" or positive wire 52 from the battery is connected in series through a main control switch 53, a fuse 54, a flasher unit 55, and an indicator light or buzzer 56 all mounted on the panel 15. The filaments 49 are tapped off the "hot" wire beyond the indicator 56 and are grounded back to the battery by a wire 57.

As shown in FIG. 5, a preferred lamp bulb 48 includes a "dim" filament 58 and a "bright" filament 59 and has its contact points to these filaments connected together to the "hot" wire 52, as illustrated by a bridging wire 60. The other ends of the filaments are grounded to the ground wire 57. In this manner both filaments 58 and 59 will be simultaneously energized when the switch 53 is closed. Alternately as shown in FIG. 7 by the single wire leading to the bulb socket 47 a single filament bulb may be used.

As shown in FIGS. 1 and 3, the indicia window 34 has the word "parking" painted, embossed or otherwise formed thereon in contrasting relationship with the translucent or frosted window surface so as not to be conspicuous until the bulbs 48 are lit. A preferred arrangement includes a white translucent window painted black except for the letters spelling the indicia. This window is then covered with a second translucent window with a desired tint to conform with state and local ordinances for vehicle signals. The overlying tinted window could be red, green, yellow or the like so that when the lamps are lit, the word "message" will beam from the vehicle in a most conspicuous manner in a desired color. Both the window containing the indicia and the overlying window can be interchanged with other word indicia windows and overlying tinted windows.

In operation, the driver of the vehicle 11 manually closes the switch 53 within easy reach from the driver's seat. A hand or foot operated switch can be used. Closing of the switch energizes the circuit 50 lighting the indicator light 56 and the bulbs 48, with the flasher 55 interrupting the circuit periodically to energize and deenergize the bulbs for projecting the word message in an attention-commanding manner rearwardly from the vehicle 11. The operation will continue until the driver manually opens the switch 53. Failure or deactivation of the vehicle's electrical system will in no way affect the circuit 50. The tying together of the two filaments in a preferred double filament bulb shown in FIG. 5 will produce a brigher light beam per bulb.

Instead of mounting the unit 10 on the outside deck 12 of the vehicle 11, it can be mounted by the same bracket 41 inside of the vehicle, for example, on the deck between the rear seat and the rear window 13 or, as shown in FIG. 13, it can be mounted on a truck 61 preferably on the rear end panel 62 thereof at the upper lefthand corner as shown in FIG. 13. In addition, or alternately, a vertical mounting for the casing 17 can be used with the same type bracket 41 as shown at 10a and the window 34 can have the legend "loading" thereon. The same adjustment of the casing 17 relative to the bracket 41 is available in any such mountings.

As also shown in FIGS. 4 and 7, the vehicle body can be used to form a surrounding casing for the lamp carrier 35 and the casing 17 may be eliminated. Thus a rectangular opening 63 may be cut through the rear portion of the trunk lid 14 of the vehicle of a size to snugly receive the carrier 35. As shown in FIG. 7, the flanges 38 and end walls 39 of the carrier fit through the opening 63 in the trunk lid and through an aligned opening 64 in the underlying framework 65 of the trunk lid. Angle strips 66 have one of the legs thereof secured to the carrier flanges 38 by rivets 67 or the like and the other legs thereof secured to the framework 65 as by fastener screws 68. This firmly unites the carrier strip 35 to the trunk lid with the arcuate body portion 36 thereof facing the opening 63. A frame 69 surrounds the opening 63 being secured to the marginal periphery thereof by fastener screws 70 and projects over the window 34 which is bottomed on the vertical flanges 37 of the carrier. A resilient gasket 71 is clamped between the frame 69 and the peripheral margin of the windowpane 34. A substantially flush mounting for the signal device embedded in the car body is thus provided and the window will beam the word message rearwardly of the body.

In another mounting arrangement, shown in FIG. 12, a station wagon 72 has a cowling 73 mounted on the rear end of the roof 74 thereof. The cowling is sized to snugly receive the lamp carrier 35 and the window 34 overlying the lamp carrier. The word message is thus beamed from the rear end of the station wagon in a most conspicuous manner.

A modified casing arrangement for the signal devices of this invention is shown in FIGS. 1 and 11, wherein the reference numeral 75 designates a rectangular plastic or metal casing having flat top and bottom walls 76 and 77, flat end walls 78, a flat front wall 79 and an open rear side 86. The lamp carrier 35 is mounted in this casing 75 in the same manner as in the casing 17 with the mounting studs 40 projecting through the end walls 39 of the lamp carrier and 78 of the casing. However, instead of providing the grooves for slidably receiving the windows 34 at the open rear and closed front sides of the casing as in the casing 17, the modified casing 75 receives a snap-on front side cover 80 and a snap-on rearside frame 81. The cover 80 has a wall 82 completely covering the front side wall 79 of the casing and bounded by a peripheral flange 83 sized to snugly fit over the top wall 76, the bottom wall 77 and the end walls 78 of the casing. Spare windows are interposed between the front wall 79 and cover wall 82 and are clamped therebetween. If desired, the flange 83 of the cover 80 can be secured to the casing 75 as by removable fasteners or the like, or a snap fit can be used.

The frame 81 has a flat side wall margin 84 overlying the peripheries of the windows 34 that are in use and a marginal flange 85 overlying the top, bottom and end walls of the casing at the open rear end 86 of the casing. The flange 85 snugly engages the casing wall and holds the frame over the open rear side of the casing. Fasteners, not shown, can be used to secure the frame to the casing. The windows 34 being used are thus clamped between the marginal wall 84 of the frame 81 and the open end face 86 of the casing.

If desired, the devices of this invention can have front and rear windows to beam images forwardly and rearwardly from the vehicle. Also the vehicle could be equipped with two devices, one mounted for forward beamings and the other mounted for rearward beamings.

From the above descriptions it will thus be clearly understood that this invention provides signal devices for vehicles which are easily installed or removed at any desired location on a vehicle, can be changed to vary word messages being beamed from a vehicle, are operated from the driver's seat independently of vehicle wiring and are easily and quickly adjusted to beam the selected word message in a conspicuous manner.

I claim as my invention:

1. A vehicle signal device comprising a casing having top, bottom, front and end walls with a window opening in the rear side thereof, an illuminating means carrier inserted in said casing through said window opening having a reflector portion facing the window opening, mounting means adjacent the front wall of the casing for mounting spare windows between the carrier and front wall of the casing, mounting means in the open rear side of the casing for selectively mounting word message windows covering the open rear side of the casing, means for securing said windows in said mounting means, holders for illuminating means on said carrier to mount illuminating means in front of the reflector portion of the carrier, means for mounting said casing on a vehicle accommodating shifting of the casing relative to the vehicle, a control panel adapted to be mounted in a vehicle adjacent the driver's seat carrying switch, fuse, indicator and flasher units, a circuit connecting the units on the panel in series with the illuminating means holders, and means for adjusting both the angle and the vertical position of the casing relative to the casing mounting means for positioning the casing as desired relative to the vehicle to beam the word message from the vehicle when the illuminating means is lit.

2. The device of claim 1 wherein the carrier is slidably fitted in the casing and has end walls engaging the casing end walls and wherein casing mounting studs project through both the carrier end walls and the casing end walls.

3. The device of claim 1 wherein the carrier is a molded plastic part having a curved reflector main body portion, outturned end flanges at the ends of the curved portion and rearwardly directed horizontal flanges extending from the end flanges for slidably engaging the top and bottom walls of the casing.

4. A multiple purpose vehicle signal device adapted to beam interchangeable word messages from a vehicle and store spare windows which comprises a casing having a window opening and a window storage compartment remote from said opening, means for removably mounting windows in the opening and in the storage compartment, means securing the windows in said opening and said storage compartment, illuminating means mounted in the casing to light the window in the opening, and bracket means adjustably securing the casing on a vehicle.

5. The signal unit of claim 4 wherein the casing has frame means clamping the windows to the casing.

6. The device of claim 4 wherein grooves are also provided in the casing behind the carrier to carry spare windows in the casing.

7. The device of claim 4 wherein the storage compartment is provided between the casing and a removable cover on the casing.

8. The device of claim 4 wherein the bracket means is a U-shaped strip with a base to be secured on the vehicle and end legs straddling the casing and secured to the ends of the casing.

* * * * *